(No Model.)

J. WYATT.
LIGHT DRAFT CORN PLANTER.

No. 346,252. Patented July 27, 1886.

Witnesses:

Inventor
James Wyatt
By Tarbell
Attorney.

UNITED STATES PATENT OFFICE.

JAMES WYATT, OF PLEASANT VIEW, KANSAS.

LIGHT-DRAFT CORN-PLANTER.

SPECIFICATION forming part of Letters Patent No. 346,252, dated July 27, 1886.

Application filed January 29, 1886. Serial No. 190,192. (No model.)

*To all whom it may concern:*

Be it known that I, JAMES WYATT, a citizen of the United States, residing at Pleasant View, in the county of Cherokee, State of Kansas, have invented certain new and useful Improvements in Light-Draft Corn-Planters, of which the following is a specification, reference being had therein to the accompanying drawings.

This invention relates to improvements in corn-planters; and its object is to initiate or attempt a departure, as to draft and simplicity of operating mechanism, from the principles of construction hitherto pursued in the art of building seeders, planters, &c.

To this end my improvements consist in certain novel parts and in the interaction of these operative elements, all of which will be fully understood from the following description, when taken in connection with the accompanying drawings, in which—

Figure 1:
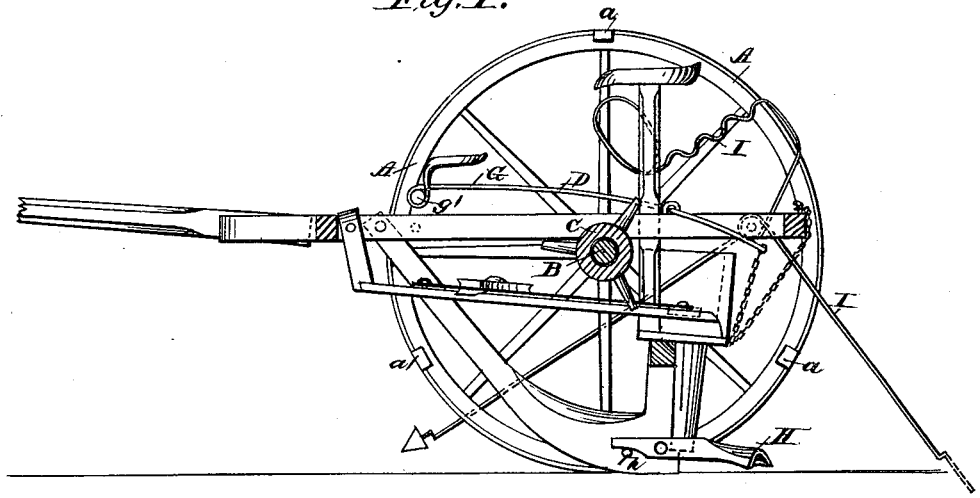
Figure 2:
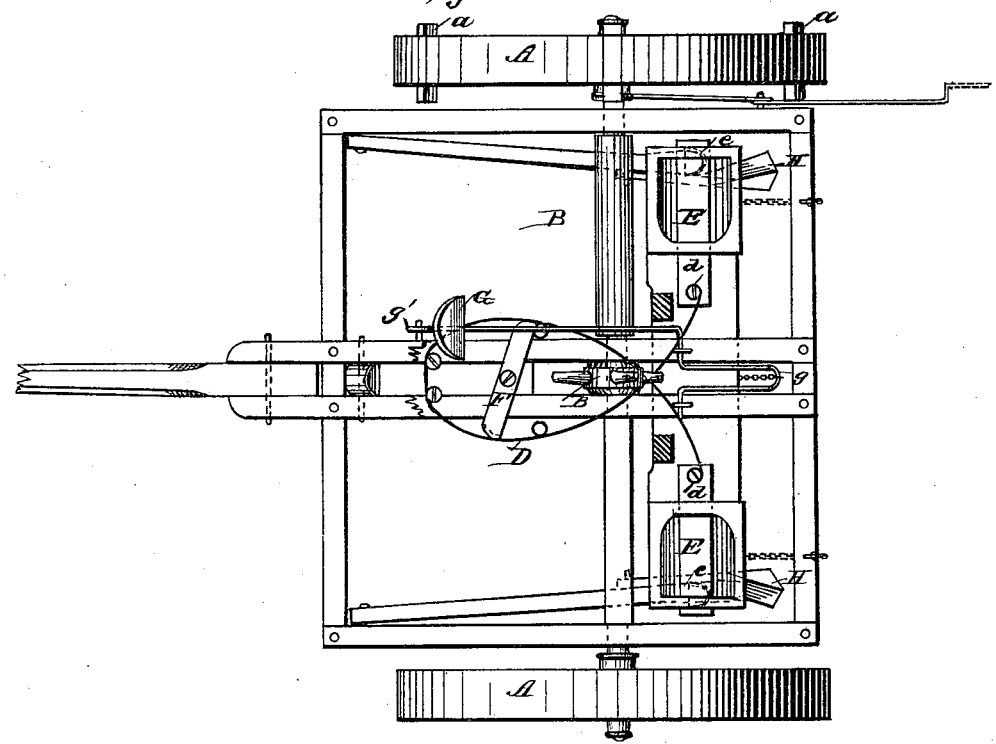

Figure 1 is a side elevation, partly in section, with the wheel removed, of my light-draft planter. Fig. 2 is a plan view of the same.

Similar letters refer to similar parts in all the figures.

My improved corn-planter is composed, substantially, of a main and an auxiliary frame, the plane of the latter being under that of the former. The first, or the cart-body proper, running, as is usual, on two wheels, consists of an open rectangular platform, having two parallel central bars with an oblong space between them, and carrying attached to its body the two cutters having ordinary heels and drop-funnels; also an elevated upright for the driver's seat, and, lastly, the usual cart-pole. The second or auxiliary frame is a light T-shaped wooden structure, having its stem partly slotted, and supporting at the opposite ends of the transverse line of its head two boxes for the reception of the corn. This second frame, upon which is arranged the major portion of the novel parts of my machine, is to the first or cart-body rigidly fastened by its stem, which is pivoted between the central bars of the platform, and it is flexibly attached to the same by its head, which is hung on by chains or strong leather straps to the back of the cart-platform, resting also on the rod that connects the cutters and supports the driver's seat of the main frame.

Having given an integral view of my light-draft corn-planter, I will now point out by letters and describe the essential elements, the operative and novel parts of my invention.

A represents the indicator-wheel, provided with three spotters or markers, a, to check-row the corn and mark the place of its deposit. This wheel is suitably attached to the axle B, which forms the rotating half of the entire axle of the cart-body, the other half being rigidly fixed to the main frame, and which independent axle B is journaled to the central bars of the cart-platform, bearing on its end the wheel C, whose spokes ply in the open space between the central bars just spoken of and in the corresponding slot of the stem of the auxiliary frame. It is the wheel C that actuates the eye-hook-shaped spring-governor D by opening with its spokes the bend of said governor's curved ends d. The bulged portion of this spring eye-hook is secured to the stem of the auxiliary frame, while the two curved ends d of the governor are pivoted to the slides E, that form the false bottoms of the corn-boxes. The interaction, therefore, of the parts already described is as follows: Indicator-wheel A turns the axle B, and with it the wheel C, whose spokes, distending the curved ends d of governor D, draw out the parts to which they are fastened—that is, the sliding bottoms E of the corn-boxes—uncovering thereby the drop-holes of the latter, through which the seed-corn falls into the marked spots of the ground, and is immediately hilled up, as will be hereinafter shown.

In continuation of the description of the parts, I will introduce again the corn-boxes, by stating that they are also provided each with a regulating attachment or cut-off, e, which is a loose small flanged piece made to fit the oblong slot on the wheel side of each box. As the sliding bottoms E pass between the drop-holes in the true bottoms of the boxes and the attachments e, it is obvious that the latter serve to regulate the quantity of the corn to be dropped through the drop-holes into the heel-funnels, and thence into the ground. In the center of the bulged portion of governor D there is movably pivoted an oblique block, F, which, when moved by the foot of the driver into a straight transverse line, distends largely the body of the governor, and shuts off thereby entirely the dropping of the corn while the machine is turning. By the driver's foot is also operated the lever G, a spring-rod journaled by its projecting elbowed end J to the central bars of the cart-platform, and provided at its outer end with loop $g'$, which latter engages with $g''$ on one of said center bars. To the elbow $g$ of this lever, dipping into the slot formed by the center bars, is flexibly attached the T-shaped auxiliary frame, so that when the driver's foot depresses the end $g'$ of the lever G the elbow $g$ is raised, lifting up to its own higher plane the auxiliary frame, and prevents thereby the impinging of the frame with rocks or other obstacles on the ground.

In the description of the essential and novel parts of my planter mention is yet to be made of the spurs H, attached one each to the cutters, and controlled by pin $h$ in their swinging motion. The concave or shovel-like shape of the lower end of these spurs, together with their location at the extremities of the cutters, is indicative of their function—to wit, to bury, cover, and hill up the corn as dropped into the ground. Attention is also asked to the last, but not least, of the operative elements of the planter—to the director I, which is a hump-backed and looped rod, loosely attached by a pin to the main frame and running between the latter and the indicator-wheel A. The duty of skimmer I is to clear, by a continuous dipping motion, the ground, and to keep the wheel A from gaining or losing distance.

Having now fully described my invention, what I desire to claim and secure by Letters Patent is—

1. In a corn-planter such as described, the combination, with draft-wheel A, axle B, and spoked wheel C, of the looped spring-wire crossing within the radius of said spoked wheel and rigidly connected to cut-offs E E, and regulator F, substantially as set forth.

2. In a corn-planter, the combination, with wheel A, axle B, spoke-wheel C, slides E, and regulators $e$, of elbowed and looped lifting-lever G, shovel-shaped spurs H, and skimmer I, all constructed and operating as shown and described.

In testimony whereof I affix my signature in presence of two witnesses.

JAMES WYATT.

Witnesses:
T. E. WOOLUM,
CHAS. A. FORD.